(12) United States Patent
Koritala (10) Patent No.: US 11,681,763 B2
(45) Date of Patent: Jun. 20, 2023

(54) SYSTEMS OF APPS USING AI BOTS FOR ONE FAMILY MEMBER TO SHARE MEMORIES AND LIFE EXPERIENCES WITH OTHER FAMILY MEMBERS

(71) Applicant: Srirajasekhar Koritala, Naperville, IL (US)

(72) Inventor: Srirajasekhar Koritala, Naperville, IL (US)

(73) Assignee: Srirajasekhar Koritala, Naperville, IL (US)

( * ) Notice: Subject to any disclaimer, the term of this patent is extended or adjusted under 35 U.S.C. 154(b) by 11 days.

(21) Appl. No.: 16/658,132

(22) Filed: Oct. 20, 2019

(65) Prior Publication Data

US 2021/0117488 A1    Apr. 22, 2021

(51) Int. Cl.
| | | |
|---|---|---|
| *G06F 16/00* | (2019.01) | |
| *G06F 16/9535* | (2019.01) | |
| *G06F 16/9536* | (2019.01) | |
| *G06F 16/951* | (2019.01) | |
| *G06Q 20/12* | (2012.01) | |

(52) U.S. Cl.
CPC ........ *G06F 16/9535* (2019.01); *G06F 16/951* (2019.01); *G06F 16/9536* (2019.01); *G06Q 20/123* (2013.01)

(58) Field of Classification Search
CPC ...... G06F 16/639; G06F 16/634; G06F 16/68; G06F 16/40; G06F 16/48; G06F 16/635; G06F 16/683; G06F 16/00; G06F 16/13; G06F 16/2246; G06F 16/24578; G06F 16/435; G06F 16/4387; G06F 16/637; G06F 16/64; G06F 16/686; G06F 16/9024; G06F 3/04817; G06F 3/0482; G06F 3/165; G06F 40/205; G06F 40/30; G06F 16/90324; G06F 16/9535; G06F 21/604; G06F 21/62; G06F 21/6218; G06F 9/54; G06F 16/958; G06F 16/972; G06F 3/0484; G06F 16/3329; G06F 16/353; G06F 21/10; G06F 40/216; G06F 40/226; G06F 40/284; G06F 16/38; G06F 16/93; G06F 16/30; G06F 16/3322; G06F 16/3323; G06F 16/3344

See application file for complete search history.

(56) References Cited

U.S. PATENT DOCUMENTS

| | | | |
|---|---|---|---|
| 10,073,923 B2 * | 9/2018 | Koren | G06F 3/0484 |
| 10,693,872 B1 * | 6/2020 | Larson | H04L 9/3228 |
| 2010/0246797 A1 * | 9/2010 | Chavez | G06F 16/951 |
| | | | 379/265.02 |
| 2013/0036342 A1 * | 2/2013 | Deo | G06Q 30/02 |
| | | | 715/202 |
| 2015/0012339 A1 * | 1/2015 | Onischuk | G07C 13/00 |
| | | | 235/386 |
| 2018/0183737 A1 * | 6/2018 | Subbarayan | G06Q 20/3223 |
| 2018/0191643 A1 * | 7/2018 | Berry | H04L 51/046 |
| 2018/0211259 A1 * | 7/2018 | Vu | G06Q 10/087 |
| 2018/0336450 A1 * | 11/2018 | Gramuglio | G06N 20/00 |
| 2019/0019160 A1 * | 1/2019 | Champaneria | G06F 40/30 |
| 2020/0168218 A1 * | 5/2020 | Eriksson | G06N 5/02 |
| 2021/0019339 A1 * | 1/2021 | Ghulati | G06Q 50/00 |

* cited by examiner

*Primary Examiner* — Shyue Jiunn Hwa
(74) *Attorney, Agent, or Firm* — Jason C. Cameron

(57) ABSTRACT

Popopmomom and Kiddoflock apps using AI bots lets the family member to share memories and life experiences with other family members in most easiest and in a more secure way. AI BOT automatically builds the biography once all the questions are answered by the Popopmomom user.

20 Claims, 12 Drawing Sheets

Client side

FIG 1

Fullfilment

Dailog flow

Popopmomom

Kiddoflock

SYSTEMS OF APPS USING AI BOTS FOR ONE FAMILY MEMBER TO SHARE MEMORIES AND LIFE EXPERIENCES WITH OTHER FAMILY MEMBERS

BACKGROUND

Field of the Invention

This invention relates to social (Systems of apps using AI bots for one family member to share memories and life experiences with other family members)

Related Art

There may be apps providing services to share their memories with their family members or friends but none of them are using AI BOT.

Prior Art did not give the privilege to the users to record their responses either through text or voice.

Prior Art did not compose the biography on it's own when answers were entered in questions and answers format.

Below are the list of problems addressed by Popopmomom and Kiddoflock apps using AI bot.

Convenience: Trained Popopmomom AI bot will ask predefined set of questions and the user can record their answers using the microphone option or can directly call AI BOT by using call option Composing Biography: Popopmomom AI Bot will compose the biography on it's own when all the questions are answered as per different stages of life.

Security: Even an invite is sent one can either record their memories or accept other's memories only after confirming their acceptance through email.

Easy Sign up: One can easily sign up using a phone number without entering any other information.

Disadvantages:—
  There is no prior solution where a family member can share their experiences either through text and voice.
  There is no prior solution where a bot can automatically compose the biography on its own as per different stages of life.
  There is no prior art trained AI BOT for sharing family members memories and life experiences.
  Prior art did not integrate and trained AI BOT to share family members memories and life experiences

SUMMARY OF INVENTION

Popopmomom and Kiddoflock are the system of apps using AI BOT which lets the family member to share memories and life experiences with other family members in most easiest and in a secure way.

Popopmomom is an app where AI BOT ask you about your childhood, education, career, experiences, habits, etc. and use that information to compose a biography of your life. You can share your story with as many people as you want. You can pass on your wisdom to future generations. The technology used her is an AI bot (Google Dialogflow) that verbally interviews you and recognizes information from your spoken answers to automatically create your biography.

Through the kiddoflock app one can ask their grandparents to record their biography through the popopmomom app. Where popopmomom is like a book of a person's life, kiddoflock is like a library of these books of people who have shared them with you.

BRIEF DESCRIPTION OF FIGURES

FIG. 2 shows Front end flow of Bodha Applications(Both Popopmomom and Kiddoflock) Embodiments of the present disclosure and their advantages are best understood by referring to the detailed description that follows. It should be appreciated that like reference numerals are used to identify like elements illustrated in one or more of the figures, wherein showings therein are for the purpose of illustrating embodiments of the present disclosure and not for purposes of limiting the same.

DETAILED DESCRIPTION

Popopmomom and Kiddoflock are the apps using AI bots for one family member to share memories and life experiences with other family members.

Popopmomom AI Bot is tailored and trained to ask customised set of questions to the user as per different stages of life.

Popopmomom AI BOT let the family members to input their answers either through text or through voice which is unique.

Popopmomom AI BOT will automatically compose biography on putting together all the answers fed into the system.

Once can view or listen to the biography composed by AI bot through Kiddoflock.

There are various steps in order to make our invention work and achieve the objective.

Firstly we have trained AI BOT by giving questions in the form of intents.

Fed and customised Popopmomom AI BOT by giving almost 168 questions in chronological order.

Once all the questions are fed into the BOT, Upon integration with the client BOT will ask the user the same questions in an orderly fashion.

It will accept the responses either through text or voice and save the input in database.

Once all the questions were answered, It will automatically compile everything and compose biography beautifully.

After answering all the questions it will let the family member to pay for Popopmomom app and share Kiddoflock invite to other family member or members based on the interest.

Once other family members received the invite from the parent they can install Kiddoflock application to access all their responses.

There are many advantages provided by the invention AI bots will let one family member to share memories and life experiences with other family members in most effective and convenient way.

AI bot will segregate the questions as per various stages of life and ask user in chronological order. It will accept the answers both in Text format and in Voice format.

Accepting the voice format answers will save user time.

AI BOT beautifully compose autobiography once all the questions are answered.

Subscription of the app is very simple by entering the OTP received through your mobile devices. One can Pay the subscription and send a gift to their family members with whom they want to share memories with. Other family members can view or listen to the story based on their convenience.

One can not access nor enter the personal data or experiences until they show their approval through email confirmation.

Main Objective of AI bot for one family member to share memories and life experiences with other family members in most effective and secure way.

Lot of precautionary steps were taken to ensure high quality of the process mentioned above.

Most commonly asked questions were collected based on gathering feedback from hundred people. Carefully trained bot in asking the questions to the member in a chronological way.

Prepared various test cases and branch cases to validate the system Of Apps using bot.

Various tests were performed in order to confirm the functionality and usability of the application.

To ensure the functionality and to get valuable feedback system of Popopmomom and Kiddoflock passed through beta Testing. Beta Testers valuable feedback is considered and necessary changes were made to enhance the process.

Figure 1:
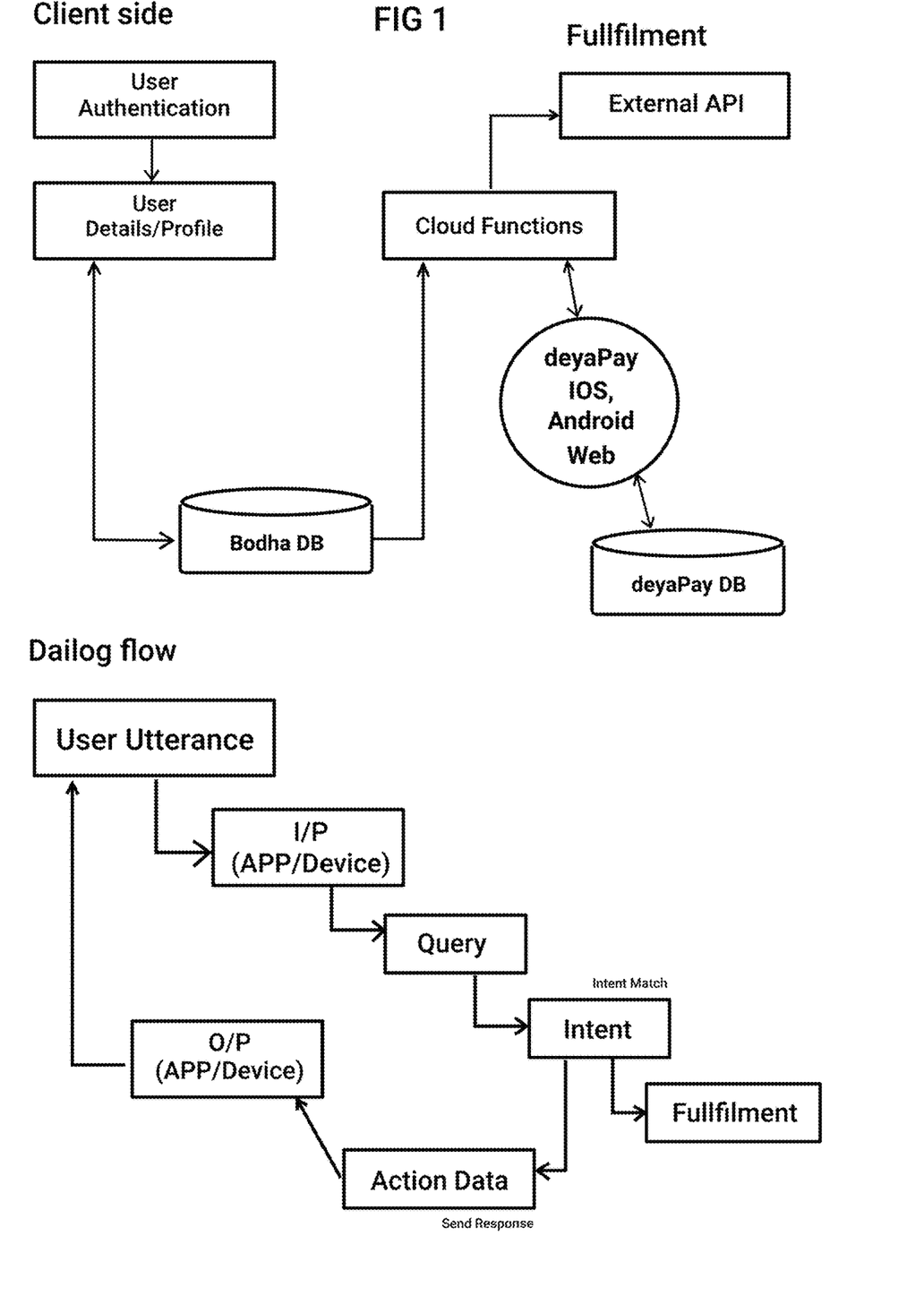
FIG. 1 shows backend flow of Bodha(Popopmomom and Kiddoflock) applications.

There are three parts to the architecture of Bodha—(FIG. 1 Description)

1. Bodha Operational Flow—

The operational flow is where sharing your story in the form of biography happens. This includes the various apps, websites and the database that constitute the system.

2. Dialog Flow—

It makes it easy to design and integrate a conversational user interface into your mobile app, web application, device, bot, and so on.

Over time the Bodha system accumulates data to create a story by recording and passing on your wisdom and knowledge to the users.

3. Payment Processing—

All of the payment processing and account management for Bodha is provided through our own proprietary payment processing system.

Bodha Operational Flow—

The operational flow includes recording and sharing the story in the form of biography. This includes the various apps, websites and the database that constitute the system. The signup information is collected through the mobile app and necessary verifications happen with the database and the confirmation of success or failure is sent back to the UI layer (the mobile app). The mobile apps are the core of the Bodha interaction model with the users. All of these mobile apps present the functionality in an intuitive manner to the user, collect the necessary inputs and store the data relevant to the Bodha system.

Cloud functions interact with and calls various APIs that provide specific functionality for the Bodha system externally.

Dialog Flow—

Dialog Flow is a natural language understanding platform that makes it easy to design and integrate a conversational user interface into your mobile app, web application, device, bot, and so on.

Over time the Bodha system accumulates data about several operations. This data is then analyzed to provide various smart and predictive functions that benefit all users.

User utterance is taken as the input to the Rest Api which sends the fulfillment text as a response of that Api to the user. Most of the interactions between the Bodha operational model and the Dialog Flow typically happen through Cloud functions. The user utterances are saved into the database and are constructed in the form of biography.

Payment Processing—

All of the payment processing and account management for Bodha is provided through deyaPay payment processing. The application layer of the Bodha operational model calls into our proprietary payment system through a cloud function-based API layer to perform various payment functionalities. These include processing payments through various payment methods, providing access to user accounts and transaction histories and splitting or sharing purchases with others.

Figure 2:
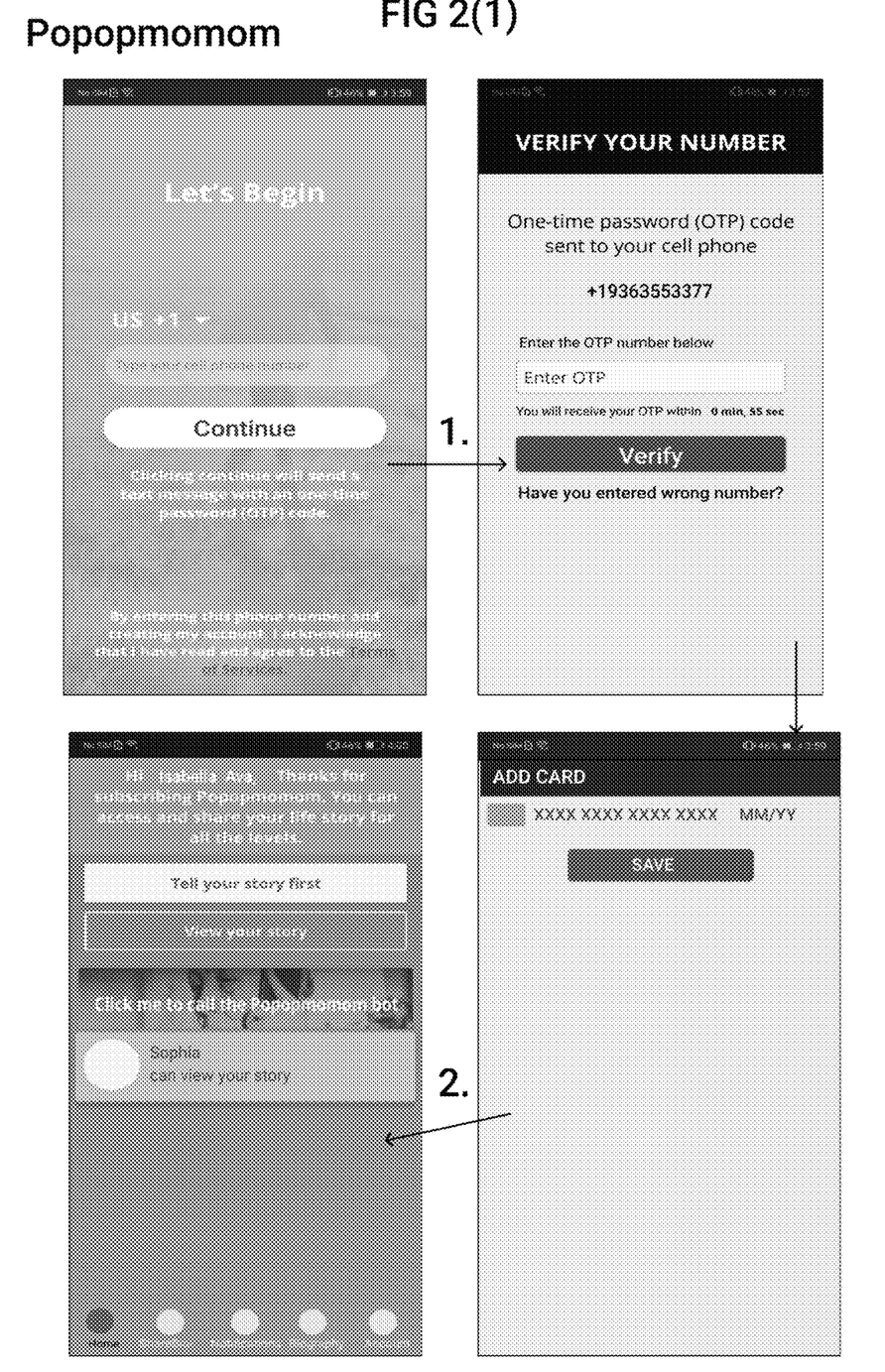

The whole method of bodha flow can be seen with the user screens as detailed below; (FIG. 2 Description)

Authentication Screen:

Screen1&2: Authentication in Bodha is through the phone, Please ensure that you choose the right country code (default pre-selected is +1 for the US). Then enter your 10 digit phone number with no spaces or special characters etc. Also, phone cannot be on the airplane mode etc. Your phone needs to have access to a cellular phone network in order to receive the OTP through SMS. Enter the OTP that is sent to your mobile number and tap verify.

Screen3: Popopmomom application offers seven day free trial period. So, Once your phone number is verified enter your card details. You card will not be charged during one week trial period. You can access first two levels during the trial period.

Popopmomom Home Page (Screen 4)

As we know Popopmomom is an app where AI BOT asks about your childhood, education, career, experiences, habits, etc. Using recorded information AI BOT automatically composes the life story on it's own. On that note Popopmomom Homepage have Tell your story option.

By clicking on Tell your story the app is navigated to the Bot pages (Screen5,6) (Where the questions are asked by the bot) in a chat format. You can either choose to answer the questions using Microphone (Screen7) or by using the call button (Screen8)

Clicking on View your Story tab helps you to view the biography which you have told to AI BOT.

Clicking on View your Life story option takes you to the levels page (screen 10) You can click on any of your completed level name to view the answers either in questions and answers format (Screen11) or in the story format (Screen12).

Main purpose of the app is one can record their life story and share the same with other family members. Now, let me explain how one can share the biography with other family members Clicking on the share bio option in the bottom side of the home screen takes Popopmomom user to the screen 13. First share is absolutely free. we can share our biography with both Kiddoflock users and Non Kiddoflock Users.

We can search and find the members who already are Kiddoflock users and share the biography with them by paying per share using our proprietary payment system.

Also

We can share the biography with non kiddoflock members by sending them a download invite.

In both the cases Popopmomom user can share his biography by paying for the share.

Non Kiddoflock user can also be invited by using their phone number. (Screen 15-22)

Clicking on notification button (Screen24) shows you the activity notifications (Screen 25&26).

Clicking on Biography Option on Popmomom Homepage (Screen 27) lets you to choose a personal writer who can compose Biography for you.

Kiddoflock:

As we know Kiddoflock users can view the Biography shared by Popopmomom users or they can request life story from Popopmomom Users.

Screen 30&31: Authentication in Kiddoflock is through the phone, Please ensure that you choose the right country code (default pre-selected is +1 for the US). Then enter your 10 digit phone number with no spaces or special characters etc. Also, phone cannot be on the airplane mode etc. Your phone needs to have access to a cellular phone network in order to receive the OTP through SMS. Enter the OTP that is sent to your mobile number and tap verify.

If you are a new user set your password once you get into the app. If you are an existing user login with fingerprint or a password which you have set earlier.

Kiddoflock Home Page (Screen32):

If we have any invitations from Popopmomom users to view their Biography, we can access and view from here.

Clicking on Popopmomom invite from the Homepage takes you to the topics screen where you can select a topic and can view Popopmomom user biography either in questions and answers format (Screen33) or in the story format (Screen 34).

Below are the other components of Kiddoflock Homepage:

Request Biography: Clicking on this option let's the Kiddoflock user to place a request for the Popopmomom user Biography.

Kiddoflock user can place the request by searching with Popopmomom user name in the search bar. That way if a member is already a Popopmomom user an invitation will be sent to him by selecting him from the search results (screen 36-screen39)

Kiddoflock user can also send invites to non popopmomom user by clicking on Invite a relative button on the (screen 40-screen 43)

For both the cases payment need to be done for placing the requests. Payments takes place through a proprietary payment system of Bodha (Screen 36-Screen43)

Notifications: Clicking on this option let's the Kiddoflock user access the notifications he have (Screen44).

Wallet: Clicking on the wallet option (Screen 45) let's the Kiddoflock users to access all the transactions related to shares of biographies they have purchased. This is done through our proprietary, cross-platform UI that we use for payment functionality in all our apps. This also gives them access to launch Apple Pay to store additional payment methods they may want to use in Apple Pay. For example, if a grandchild purchase shares requesting biographies from their four grandparents, then those transactions would be listed.

Settings: Clicking on the setting option (Screen 46) Kiddoflock user can access his or her profile and can makes changes to the profile.

By taking an example here for creating a biography and sharing memories with other family members through the Bodha Application may be described as follows with reference to the FIG. 2 and marked numerals therein.

Both apps called as Popopmomom and kiddoflock are integrated to gain full experience of creating and sharing the biography.

Firstly, when we look into Popopmomom, any user may enter into the app with screen (1) by giving their mobile number for verification through OTP generation and the same may be entered in screen (2), and proceed to screen (3) to save their payment card. The user may enter to next screen/home screen (4) to select the options. In this screen (4) the user has the options of selecting buttons for creating biography and viewing biography. Further options of sharing biography, notifications, viewing account is also present.

From the home screen (4), the user may proceed to to create biography by clicking on "tell your story first" which will take the user to screen (5) to complete all steps one after the other by answering questions put by AI Bots. This is shown in screen (5) where the AI Bots asks questions for which user may record voice as shown in screen (6), also may send as chat messages as in screen (7). In other cases the user may simply dial a contact number of AI Bots as shown in screen (8).

If the user in the home screen (4) selects option to view story by clicking the button view your story, then it will take to screen (9) from there user has option to view the story as question & answer format or biography format as in screen (10, 11, 12).

If the user in the home screen (4) selects option to share bio next screen (13) opens from there select person name to whom to share as in screen (14), or may create a profile of someone who can see their bio through screen (15) and proceed to payment through screen (16, 17, 18).

If the user in the home screen (4) selects option to view notifications next screen (24) will be opened where user may accept or reject any request sent and if rejected goes to screen (26) or accepted goes to screen (25).

If the user in the home screen (4) selects option to engage a personal biographer, then next screen (27) opens and user may select their choice of personal biographer who will help to write the user biography after finishing their answers to questions in screen (5).

If the user in the home screen (4) selects option to view their account, next screen (28) opens which will show the account details as per screen (28).

The next application called as kiddoflock is a supporting app for the popopmomom which is used to view the biography created by the parents, friends and relatives.

The user may create their account for login from screens (30,31,32) and enter into screen (33) to see various options to view the history of the parents biography by going to screen (34,35).

If the user in home screen (32) wishes to request someones biography may select the option, and next screen (36) will be opened where they can view by making payment in screen (37) and proceed.

In case the user here in screen (36) wishes to invite a relative to share their biography, the user enters the next screen (41, 42, 43) and request will be sent.

If the user in the home screen (32) wishes to see the notifications, may enter into screen (44) and see the notifications.

If the user in the home screen (32) wishes to see the wallet balance, may enter to screen (45).

If the user in the home screen (32) wishes to see settings may enter to screen (46), Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A computer implemented system for online sharing of a registered user's content, comprising:
    an Artificial Intelligence (AI) bot operatively coupled to a processor and configured to
    ask the registered user a predefined set of questions for extracting relevant personal information corresponding to different stages of life of the registered user, wherein the predefined set of questions are based on gathered feedback from associated databases, wherein the predefined set of questions comprises questions related to childhood, education, career, experiences, and habits;
    receive one or more inputs against each of the predefined set of questions from one or more registered users;
    compose a biography of the registered user by obtaining user utterance as an input to REST Application Program Interface (API), wherein the user utterance is transformed into fulfilment text as a response of the REST API through cloud functions;
    enable the online sharing of the biography of the registered user with other one or more registered users and unregistered users;
    allowing the other one or more registered users and unregistered users to access a shared link to view the biography upon receiving a payment and an approval from the registered user; and
    wherein sharing of the biography, accessing the biography, payment, and data integration with other one or more systems is enabled by one or more Application program Interfaces (APIs).

2. The system of claim 1, wherein the Artificial Intelligence bot is configured to register a user as the registered user, via an authentication screen, based on a phone number with a country code.

3. The system of claim 1, wherein the Artificial Intelligence bot is configured to ask one or more questions from the predefined set of questions in an orderly fashion.

4. The system of claim 1, wherein the predefined set of questions comprises 168 questions in a chronological order.

5. The system of claim 1, wherein the one or more inputs against each of the predefined set of questions comprises at least one of text input, voice input or combination thereof.

6. The system of claim 1, wherein the voice input comprises utterances received from the registered user.

7. The system of claim 1, wherein the voice input is received from a microphone configured in smart phone associated with the registered user.

8. The system of claim 1, wherein the Artificial Intelligence bot composes the biography by segregating the one or more inputs received for the predefined set of questions as per various stages of life asked in the chronological order.

9. The system of claim 1, wherein the approval is shown through an email confirmation.

10. The system of claim 1, further configured to provide a plurality of smart and predictive functions for registered users, wherein the smart and predictive functions are provided based on accumulated one or more inputs received against each of the predefined set of questions from a plurality of registered users.

11. A computer implemented method for online sharing of a registered user's content, comprising:
    asking, via an Artificial Intelligence bot using a conversational user interface and operatively coupled to a processor, the registered user a predefined set of questions for extracting relevant personal information corresponding to different stages of life of the registered user, wherein the predefined set of questions are based on gathered feedback from associated databases, wherein the predefined set of questions comprises questions related to childhood, education, career, experiences, and habits;
    receiving, via the Artificial Intelligence bot using the conversational user interface, one or more inputs against each of the predefined set of questions from one or more registered users;
    composing, via the Artificial Intelligence bot, a biography of the registered user by obtaining user utterance as an input to REST Application Program Interface (API), wherein the user utterance is transformed into fulfilment text as a response of REST API through cloud functions;
    enabling, via the Artificial Intelligence bot, the online sharing of the biography of the registered user with other one or more registered users and unregistered users, wherein the biography is shared via an invitation link; and
    allowing, via the Artificial Intelligence bot, the other one or more registered users and unregistered users to access a shared invitation link to view the biography upon receiving a payment and an approval from the registered user.

12. The method of claim 11, wherein a user is registered as the registered user, via an authentication screen, based on a phone number with a country code.

13. The method of claim 11, wherein the asking of the predefined set of questions comprises asking one or more questions from the predefined set of questions in an orderly fashion.

14. The method of claim 11, wherein the predefined set of questions comprises 168 questions in a chronological order.

15. The method of claim 11, wherein the one or more inputs against each of the predefined set of questions comprises at least one of text input, voice input or combination thereof.

16. The method of claim 11, wherein the voice input comprises utterances received from the registered user in response to the predefined set of questions asked.

17. The method of claim 11, wherein the voice input is received from a microphone configured in smart phone associated with the registered user.

18. The method of claim 11, wherein the composing of the biography comprises segregating the one or more inputs received for the predefined set of questions as per various stages of life and ask user in chronological order.

19. The method of claim 11, wherein the approval is shown through an email confirmation.

20. The method of claim 11, further comprises providing a plurality of smart and predictive functions for registered users, wherein the smart and predictive functions are provided based on accumulated one or more inputs received against each of the predefined set of questions from a plurality of registered users.

* * * * *